(12) United States Patent
Shevenell et al.

(10) Patent No.: US 7,620,535 B2
(45) Date of Patent: Nov. 17, 2009

(54) METHOD AND APPARATUS FOR THE SIMULATION OF COMPUTER NETWORKS

(75) Inventors: Michael P. Shevenell, Dover, NH (US); Lundy M. Lewis, Mason, NH (US)

(73) Assignee: Computer Associates Think, Inc., Islandia, NY (US)

( * ) Notice: Subject to any disclaimer, the term of this patent is extended or adjusted under 35 U.S.C. 154(b) by 912 days.

(21) Appl. No.: 10/325,647

(22) Filed: Dec. 19, 2002

(65) Prior Publication Data

US 2004/0122645 A1 Jun. 24, 2004

(51) Int. Cl.
G06F 17/50 (2006.01)
G06F 9/44 (2006.01)
G06F 15/173 (2006.01)

(52) U.S. Cl. .................... 703/13; 703/21; 709/224

(58) Field of Classification Search ......... 709/223–226, 709/249, 250–253, 200, 238; 703/13, 21, 703/22; 714/41
See application file for complete search history.

(56) References Cited

U.S. PATENT DOCUMENTS

| | | | | |
|---|---|---|---|---|
| 5,751,965 | A * | 5/1998 | Mayo et al. | 709/224 |
| 5,809,282 | A * | 9/1998 | Cooper et al. | 709/226 |
| 5,907,696 | A * | 5/1999 | Stilwell et al. | 703/13 |
| 6,011,537 | A * | 1/2000 | Slotznick | 715/733 |
| 6,687,748 | B1 * | 2/2004 | Zhang et al. | 709/223 |
| 6,892,233 | B1 * | 5/2005 | Christian et al. | 709/223 |
| 6,944,596 | B1 * | 9/2005 | Gray et al. | 705/1 |
| 6,983,232 | B2 * | 1/2006 | Nguyen et al. | 703/7 |
| 2001/0011215 | A1 * | 8/2001 | Beeker et al. | 703/27 |
| 2002/0032762 | A1 * | 3/2002 | Price et al. | 709/223 |
| 2002/0059052 | A1 * | 5/2002 | Bloch et al. | 703/13 |
| 2003/0154279 | A1 * | 8/2003 | Aziz | 709/225 |
| 2004/0111502 | A1 * | 6/2004 | Oates | 709/223 |
| 2006/0149524 | A1 * | 7/2006 | Kalyanaraman et al. | 703/13 |

OTHER PUBLICATIONS

Microsoft Visio 2002 Network Tools, 1998.*
OPNET IT Guru, 2001, Opnet technologies, inc.*
OPNET modeler, The Network Simulation Power Tool, Third Millemmium Technologies, 1999.*
CACI Products Company, Nov. 1996, COMNET III Tutorial, A Detailed Guide to Modeling Networks with COMNET III, p. 1-217.*
SIMPLESOFT, SimpleAgent, SNMP Agent Simulator, www.snmptest.com/SimpleAgent.html, 2 pages.
SIMPLESOFT, SimpleAgentPro, SNMP Netowrk Simulator, www.snmptest.cam/SimpleAgentPro.html, 7 pages.

* cited by examiner

*Primary Examiner*—Paul L Rodriguez
*Assistant Examiner*—Eunhee Kim
(74) *Attorney, Agent, or Firm*—Pillsbury Winthrop Shaw Pittman LLP

(57) ABSTRACT

A system and method are provided for simulating computer networks. Network device simulator provides individual simulations of individual network devices, which operate independently of one another. Network simulator contains the simulated network topology and provides connection information to the network device simulators. The network simulator also allows an operator to alter the simulator topology and inject simulator conditions. A Network Management Station (NMS) manages the simulated network as if it were a real network.

55 Claims, 9 Drawing Sheets

METHOD AND APPARATUS FOR THE SIMULATION OF COMPUTER NETWORKS

FIELD OF THE INVENTION

The present invention relates generally to simulation of systems, and, more particularly to a method and apparatus for simulating computer networks.

BACKGROUND OF THE INVENTION

Computer networks are widely used to provide increased computing power, sharing of resources and communication between users. The widespread use of computer networks has resulted in increased reliance on these networks for everyday business operations as well as for personal use. At the same time, widespread use of computer networks has also resulted in these networks becoming increasingly larger and more complex.

As networks become more complex, systems that perform fault detection and correction in these networks -become more important. More particularly, it is desirable to have a computer network designed so that the deleterious effects of network faults are minimized. Such faults could include a network device turned off, a hardware failure in a network device, a port disabled or down, a high volume of network traffic, or a broken link between network devices. It is also desirable to be able to predict, with some degree of accuracy, the behavior of a network when such faults or other occurrences are introduced into the network. These other occurrences could be, for example, adding new devices to network, removing devices from the network, or replacing network devices.

Network management systems are often used by a network administrator to detect and resolve problems associated with the faults discussed above. Network management systems are generally capable of monitoring, accounting for, and controlling network resources. For example, a network management system may be capable of managing routers, switches, hubs, and their interconnecting hardware. Thus, network management stations can use information collected from monitoring the network to detect, isolate and repair common problems, either automatically or with the involvement of less-skilled personnel. By simulating a network, a network administrator may test a proposed network design before using the design in a live environment.

There are many methods for simulating a network. One method involves physically building the network in a closed laboratory environment. In this method, actual physical hardware components are linked together according to the desired network topology. Then, the network is simulated using artificial network traffic. Effects of this network traffic on the proposed network design can then be monitored and problems determined. One drawback of this method is that it may be difficult to generate artificial network traffic that fully tests the fault tolerance of the network. Moreover, even if a fault is detected using the artificial network traffic, it may be difficult to recreate the conditions which produced the fault. Another disadvantage of this simulation method is that it may be difficult and unwieldy to change the network configuration in response to simulation data, especially when the network is large and includes many devices. Changing the network configuration generally involves physically moving and reconnecting cables and interconnecting hardware that connect the network devices. This can be a very daunting and time-consuming task as interconnection and configuration of network devices is a difficult process. Thus, using a physical simulation of a network can be very time consuming, inaccurate, and inefficient.

Another method for simulating a network includes modeling network devices and performing an offline network simulation using specially programmed software tools. Such tools, such as the Comnet III system, allow a user to define a diagram model of the network. In Comnet III system, the network topology may be defined by positioning the node and link icon in the display. The nodes and links can be connected and the desired topology and attributes of each node or link may be set. Next, network traffic is defined by indicating, for example, message sources and response sources for each origin node and destination node. Other parameters, such as the length in time of the simulation, the warm-up time before the simulation begins and the number of simulation runs to be performed may also be specified. The simulation may then execute and generate reports during and after the simulation including device status and results of the simulation. These reports may include node utilization and application delays, link delays and utilization, message delays, packet delays, calls blocked, etc. This type of offline simulation is disadvantageous because it does not allow modification of the network during the simulation. Also, creation and interconnection of network models is a time-consuming process.

SUMMARY OF THE INVENTION

According to one aspect of the invention a method is provided for simulating a computer network. The method comprises acts of: a) simulating a plurality of network entities using at least one network entity simulator, the at least one network entity simulator being responsive to network messages; b) simulating connections between the plurality of network entities; and c) providing access for managing the acts a) and b) by providing network messages to the at least one network entity simulator. In one embodiment, network messages are provided to the network entity simulator over a communications network. The network entity simulator may be responsive to communications received over a communications network according to a network management protocol. In one embodiment, the network management protocol is simple network management protocol (SNMP). In one embodiment of the invention, connections between the plurality of network entities are simulated using a network diagramming tool. Simulated conditions may be injected using the network diagramming tool.

In another aspect of the invention, a method for testing a network management algorithm is provided. The method comprises acts of: a) providing a simulation of a computer network, the simulation being responsive to communications received over a communications network; and b) using a network management station external to the simulation to apply a management algorithm to the simulation. In one embodiment of the invention, the method further comprises an act of evaluating results of the management algorithm on the simulation. In one embodiment, act a) further comprises simulating a plurality of networks entities using at least one network entity simulator, the at least one network entity simulator being responsive to communications received over a communications network and simulating connections between the plurality of network entities.

In another aspect of the invention, a method for simulating a computer network is provided comprising acts of: providing a diagram of a network using a diagramming tool; identifying at least two network entities in the diagram; and identifying connections between the at least two network entities in the diagram. In one embodiment, the method further comprises agent engines for each of the at least two network entities identified in the diagram. The simulation may be managed by a network management station, which manages the simulation over a communications network. The simulation may also be modified dynamically, by modifying the diagram.

In another aspect of the invention, a system is provided for simulating a computer network. The system comprises acts of: at least one network entity simulator adapted to send and receive network messages; and a network simulator for providing network connection data to the at least one network entity simulator. In one embodiment, the at least one network entity simulator further comprises a plurality of agent engines, each simulating an agent of a real network entity. An agent manager may also be provided for controlling operation of the plurality of agent engines. In one embodiment, the network simulator may include a network diagramming tool for providing diagrams of simulated networks. The network diagramming tool may have a user interface which allows user modification of the simulated networks. The system may also comprise interprocess communication means for transferring data between the network simulator and the at least one network entity simulator. The network diagram may include icons which represent simulated network entities.

The structure and operation of various embodiments of the present invention are described in detail below with reference to the accompanying drawings.

DETAILED DESCRIPTION

Figure 1:
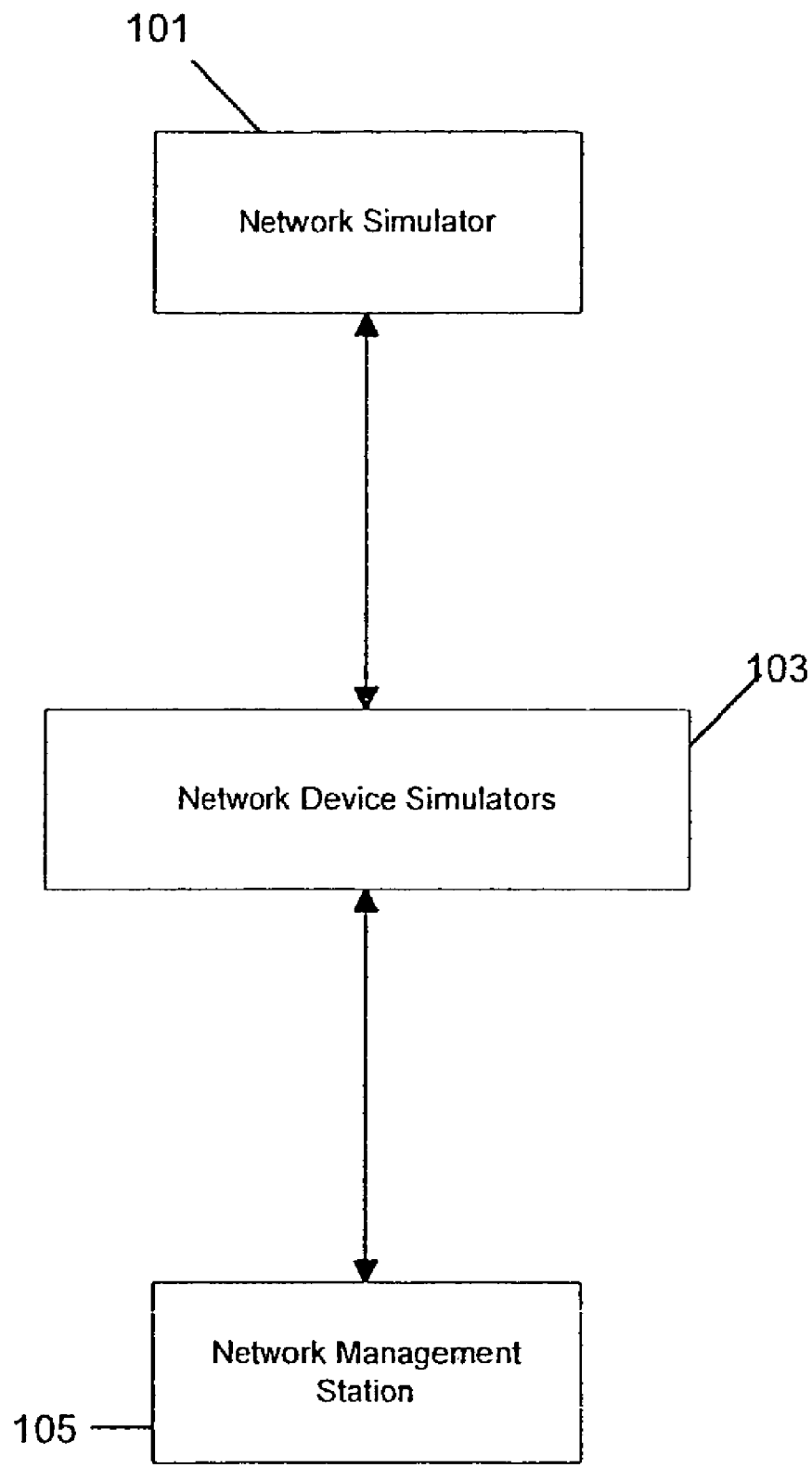
FIG. 1 is a block diagram of a system for performing a network simulation according to one embodiment of the present invention.

FIG. 1 depicts generally a system for simulating a network according to one embodiment of the present invention. FIG. 1 shows a network simulator and user interface 101, network device simulators 103, and network management station (NMS) 105.

Network device simulator 103 provides individual simulations of individual network devices, which operate independently of one another. Network device simulator 103 and user interface 101 which is responsible for control of the simulator network contains the simulated network topology and provided connection information to the network device simulators. Network device simulator 103 also allows an operator to alter the simulated topology and inject simulated conditions. NMS 105 manages the simulator network as if it were a real network. Network simulator 101, network device simulators 103, and NMS 105 may be implemented by, for example, computer programs running on the same computer or they may be implemented as computer programs running on different computers. These programs may be executed on any general purpose computer system, which typically includes a processor connected to a memory system via an interconnection mechanism such as a computer bus. Input/output (I/O) devices such as disk controllers, graphic cards, or the like may be included in the computer system. The computer system is capable of executing an operating system and is generally programmable by using a high level computer programming language such as the C++ programming language. However, any suitable programming language may be used to program the computer system.

The general purpose computer system preferably includes a commercially available processor, such as the Celeron, Pentium, Pentium II, Pentium III, or Pentium IV microprocessors available from the Intel Corporation, PowerPC Microprocessor, SPARC Processor available from Sun Microsystems, PA-RISC Processors available from the Hewlett-Packard Corporation, or a 68000 Series microprocessor from Motorola. Many other processors are also available. Such a processor generally executes an operating system which may be, for example, DOS, Windows 95, Windows 98, Windows NT, Windows 2000, or Windows XP operating systems available from the Microsoft Corporation, the system 7.X operating system available from Apple Computer, the Solaris operating system available from Sun Microsystems, the UNIX operating systems and its variants available from many vendors including Sun Microsystems, Inc., Hewlett-Packard, Red Hat Computing, and AT&T, or the Netware operating system available from Novell, Inc. The operating system controls the execution of other computer programs and provides scheduling, debugging, I/O control, accounting, computation, storage assignment, data management, memory management, communication control and related services.

The operating system also interfaces with firmware and hardware of the computer system in a well-known manner to access I/O devices and the memory system. The memory system may be any commonly available random access memory or read-only memory, a hard drive, CD-ROM, tape system, or the like used to store and/or retrieve data.

Elements according to various embodiments of the present invention may be implemented in any software language. For example, the components may be implemented in C++, Java, ActiveX, C# (C-Sharp), or SmallTalk. Alternatively, various aspects of the invention may be implemented in hardware. Many other software languages could be used. As mentioned above, the software components shown in FIG. 1 may be running on different machines. These machines may be connected by a computer network. Any type of networking technology may be used, for example, Ethernet, Fast Ethernet, ATM, FDDI, or the like.

It should be appreciated that the term "network device", as used herein refers to any network entity including, but not limited to, networking hardware (e.g., a router, a switch, and/or network hub), transmission media (e.g., cable), or abstract entities such as, for example, applications, processes, systems and services. Thus, various embodiments of the present invention may be used to simulate any network entity, and the invention is not limited in any way to the type of entity being simulated.

Network device simulators 103 may be one or more computer processes simulating one or more real network devices. Any network device (e.g., a router, a switch, a bridge, application, process, etc.) may be simulated by network device simulators 103. The simulated network devices can be programmed to respond to network messages to emulate real network devices or entities that can be managed. Network Management Station 105 may be, for example, any commercially-available system or may be any system that performs management functions. NMSs are generally used to manage devices and other entities related to the operation of the network. For example, a network management system may be capable of managing entities such as routers, switches, hubs, and their interconnecting hardware, as well as abstract entities such as applications, business processes, and services.

NMSs incorporate the knowledge of the networking expert such that common problems can be detected, isolated and repaired, either automatically or with the involvement of less-skilled personnel. Examples of NMSs include the Aprisma Spectrum, HP Openview and IBM Netview network management systems.

NMS 105 can provide messages, such as network queries to network device simulators 103. Network device simulators 103 can consequently respond to the network queries provided by the NMS just like a real device. This type of network device simulation is disclosed by Stillwell in U.S. Pat. No. 5,907,696, which is hereby incorporated by reference in its entirety.

Stillwell discloses a method for creating the appearance of a network device and its communications. In this method, a network device has a dataset which contains a plurality of variables each having instance values which change over time and describe the behavior of the device on the network. A characterization file is created from the data set and is used to generate predicted instance values for a simulated device.

Figure 3:
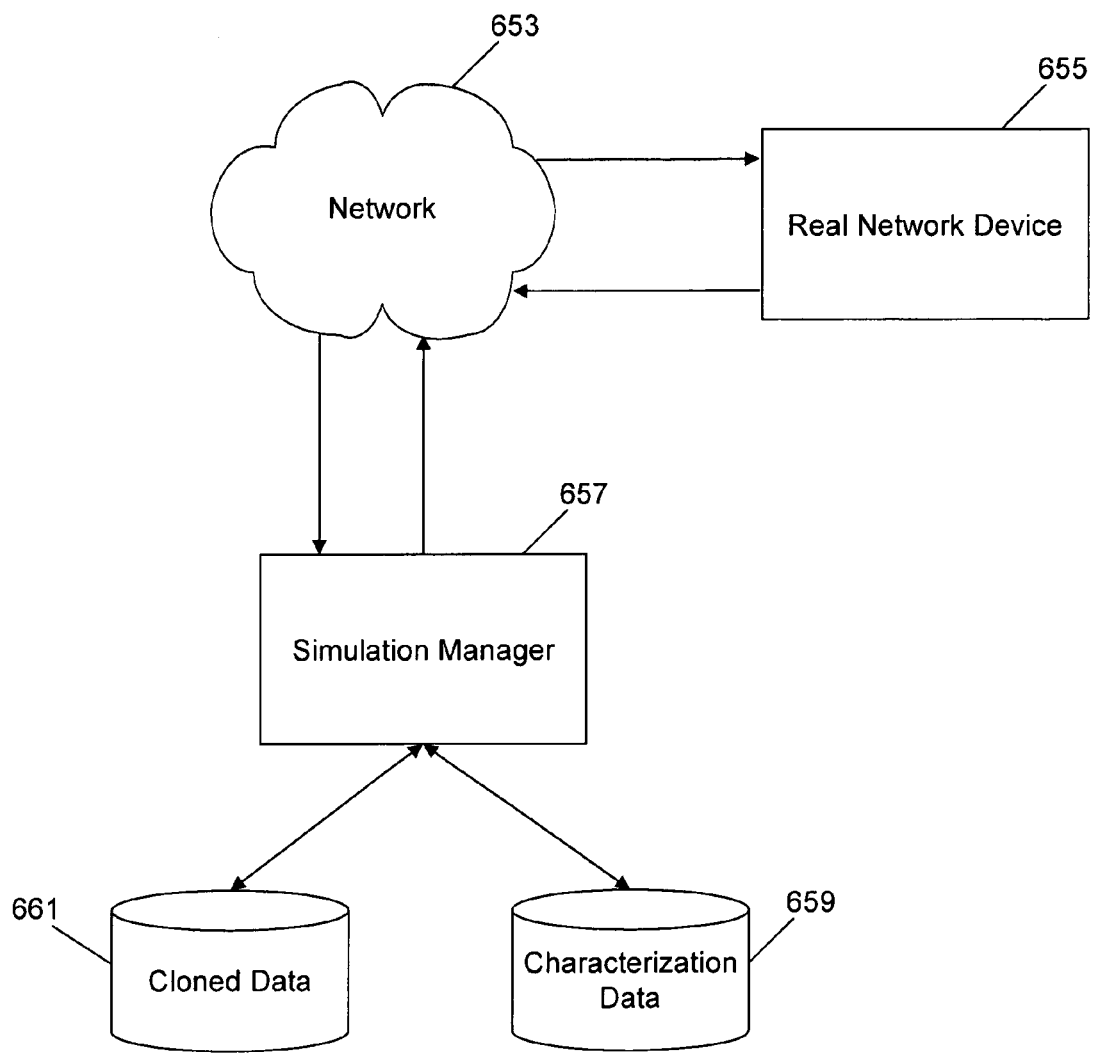
FIG. 3 is a diagram illustrating an example of a method of capturing of datasets for simulating network devices according to one embodiment of the invention.

Datasets for an agent engine can be created in a number of ways. One method of creating a dataset for a network device simulator described by Stillwell is known as cloning, and is illustrated in FIG. 3. FIG. 3 shows a real network device 655, which is the device to be cloned. Real network device 655 is connected through a network 653 to agent manager 657. Agent manager 657 in turn stores data received over network 653 into two data sets, cloned data 661 and characterization data 659.

In operation, agent manager 657 sends network messages to real network device 655 through network 653. The network messages may be any type of network message, such as an Simple Network Management Protocol (SNMP) messages. For example, agent manager 657 may send a plurality of SNMP queries over a period of time to real network device 655. In response, real network device 655 issues SNMP response messages to the SNMP queries and agent manager 657 records these SNMP responses in data set 661. Characterization data 659 can then be created based on the cloned data from data sets 661. Characterization data 659 is information which describes how an object's instance values behave over time. For example, characterization data 659 may describe a range for object instance values and a mean and standard deviation value. Using this recorded data, an agent engine can respond to SNMP queries as if the agent were a real network device. Alternative, datasets may be created by manually entering fabricated network data or by manually modifying recorded datasets.

Figure 2:
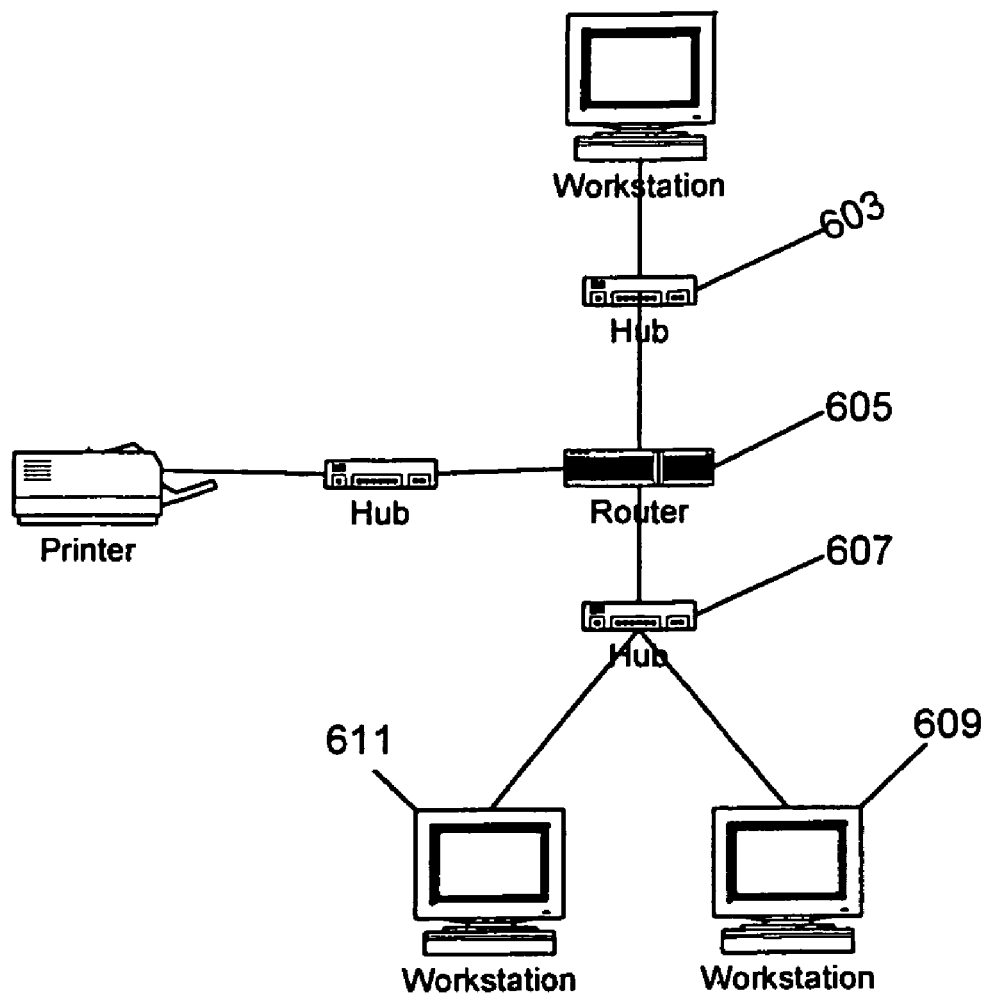
FIG. 2 is a diagram of an example of a network that may be simulated according to various embodiments of the present invention.

However, using this method, network devices operate independently of one another. For example, a network device simulation of a NetGear hub may not have access to the status of the Cisco router to which it is actually connected to in the network topology. Referring to FIG. 2, for example, suppose a user wishes to simulate the example network shown in FIG. 2. Assume hub 603 is connected to port 1 of router 605 and hub 607 is connected to port 2 of router 605. Now suppose that a user wishes to simulate this network when port 1 of router 605 is disabled. Thus, it is desirable that not only the device simulator of router 605 respond accurately to any network messages regarding the status of port 1, but also that the device simulator of hub 603 fail to respond to any network messages sent to it through router 605, since it is now isolated from the rest of the network due to the disablement of port 1 of router 605. To accomplish this, hub 603 must not only have access to its own status, but also to the status of the connection between itself and router 605.

Likewise, to simulate the network accurately, the simulation system must track the connections between devices and their status. According to one embodiment of the invention, network simulator 101 maintains information about the network topology. Network simulator 101 monitors and controls the status of one or more connections in the simulated network topology. When a connection is disabled by, for example, a user simulating the network to test fault tolerance, network simulator 101 can inform the appropriate network device simulations. Thus, the connections between simulated network devices may also be simulated.

Unlike the system described by Stilwell, which allows only single devices to be tested, various embodiments of the invention allow management algorithms that relate to more than one network device to be tested. Therefore, according to various aspects of the invention, the effectiveness of management algorithms can be tested on such a simulation of the network. It is often desirable to have a network management system in which the management algorithms efficiently detect, isolate, repair, and report network problems.

For example, a network management station, which may be an actual management station and not a simulation, may be used to manage the simulated network. The NMS may be programmed with management algorithms, such as root cause analysis algorithms, impact analysis algorithms, event correlation algorithms, and the like to manage the simulated network. Then, simulated conditions may be injected into the simulated network, such as faults, outages, performance degradations, etc., to determine if the management algorithms detect and respond to these faults as desired.

Figure 4:
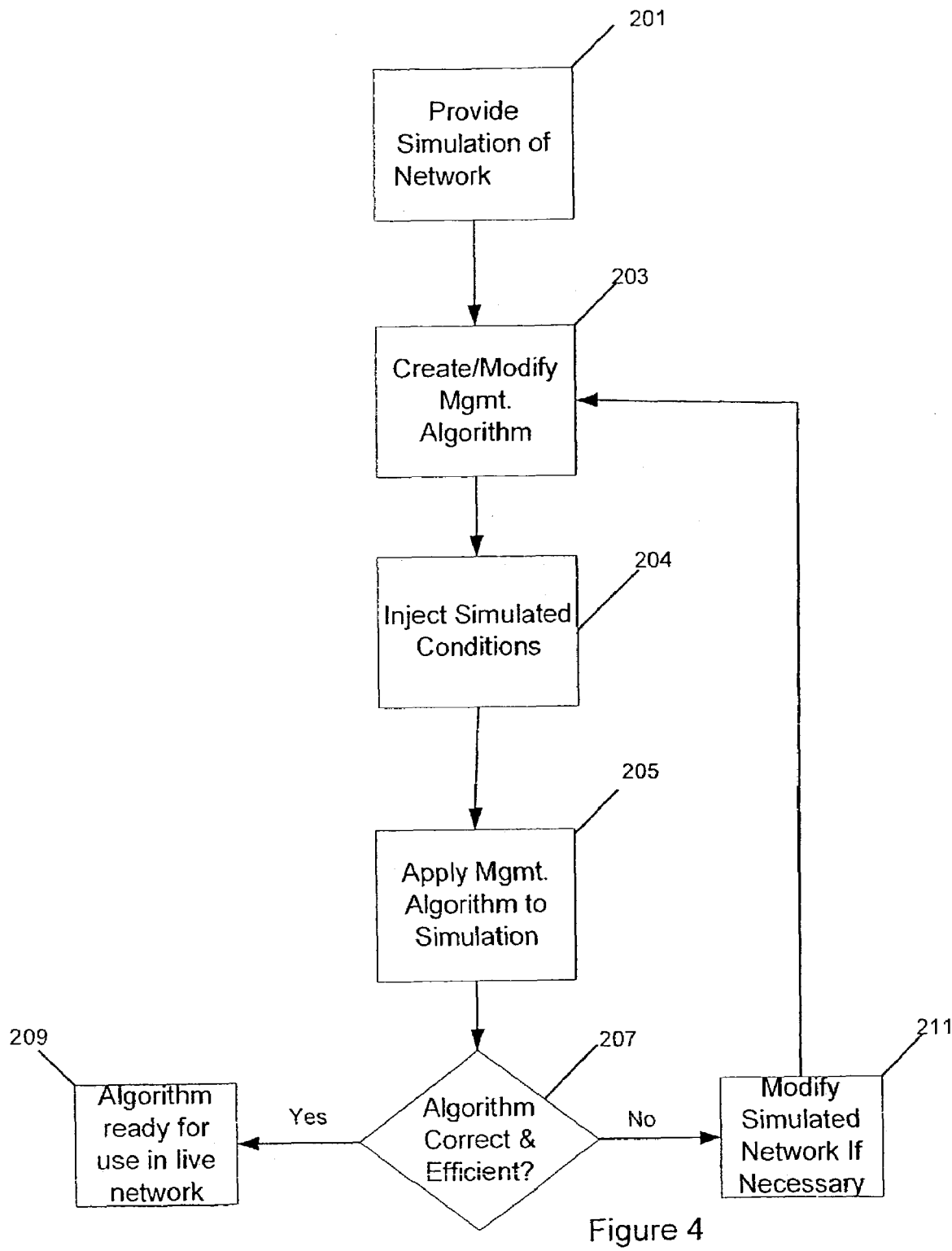
FIG. 4 is a flowchart of an example method of testing management algorithms on a simulated network according to one embodiment of the invention.

FIG. 4 illustrates one such process of testing management algorithms according to one embodiment of the invention. As shown in step 201, a simulation of a network is provided. For example, network simulator 101 and network device simulators 103 simulate a network such as the network shown in FIG. 2. In step 203, a management algorithm is constructed. This management algorithm could be, for example, a root cause analysis algorithm used to determine the initial cause of a multitude of problems in the network. For example, disabling a bridge in a network could cause many devices in the network to fail to respond to network messages. A root cause analysis algorithm may be used to determine that the initial cause of failure of many devices is a result of the bridge being disabled, instead of many individual problems in the devices connected to the bridge.

Once the algorithm is created in step 203, a simulated condition may be injected automatically or by a user using network simulation into the network in step 204. Such a condition may be, for example, provided by disabling, within the simulation hub 607, resulting in workstations 609 and 611 being disconnected from the rest of the network. The algorithm to be tested, (e.g., root cause algorithm) can then be applied in step 205 by using an NMS to manage the simulation to attempt to determine where the fault lies in the network. If the algorithm is determined to be correct and efficient in step 207, that is if it determines, for example, that hub 607 is the root cause of workstations 609 and 611 failure, then the algorithm may be used in a live network in step 209. If the algorithm is determined to be is incorrect or inefficient in step 207, a network administrator may modify the algorithm to make it function as desired in step 211. Then the management algorithm may be retested. In this manner, the amount of time needed to test management algorithms is reduced, as the simulation eliminates the need for building a test network and simulating fault conditions.

Figure 5A:
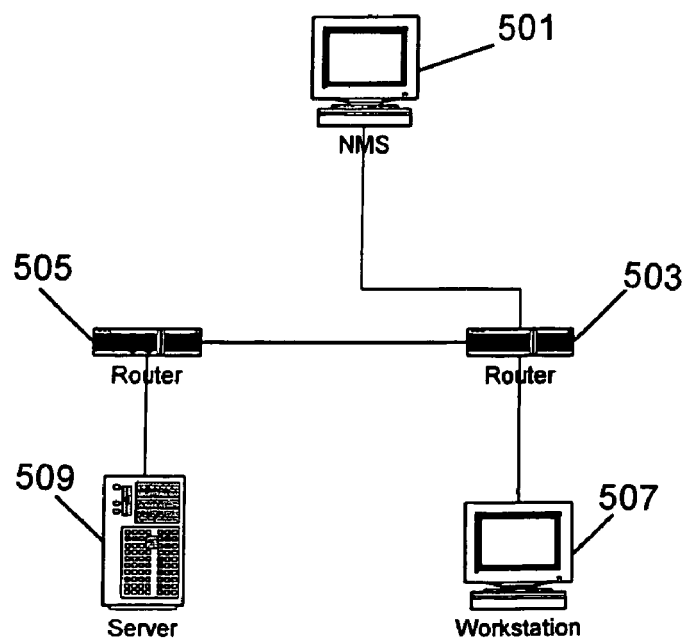
FIGS. 5A and 5B are diagrams of networks that may be simulated by various embodiments of the present invention.
Figure 5B:
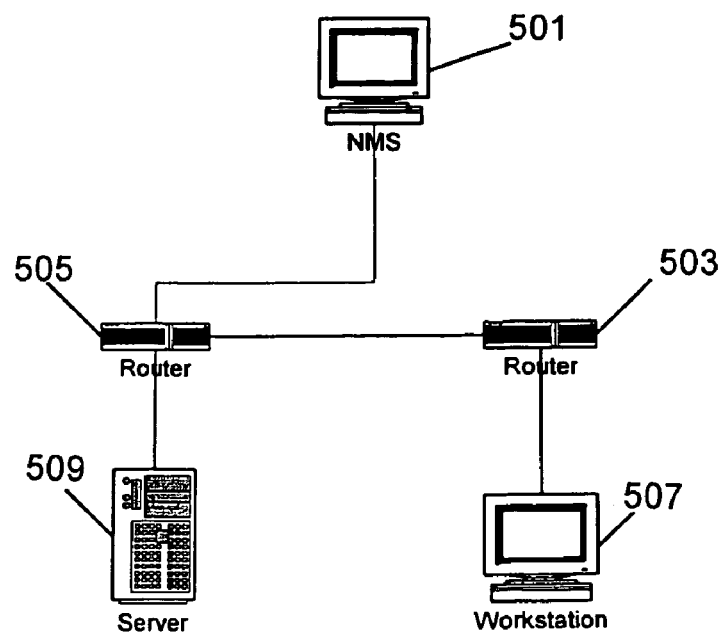

A simulation system according to one embodiment of the invention may allow the NMS to be connected anywhere in the simulated network topology. For example, referring to FIG. 5A, NMS 501 is shown connected to router 503. In FIG. 5B NMS 501 is shown connected to router 505. The vantage point of the NMS may have an effect on the management algorithms being used. For example, suppose router 503 is disabled. Because in FIG. 5A, NMS 501 is connected to router 503 all other network devices will be inaccessible to NMS 501. However, if router 503 is disabled and NMS is connected to router 505 as shown in FIG. 5B, router 505 and server 509 will still be accessible to the NMS while only router 503 and workstation 507 will not be accessible. Because the NMS can be connected to any point within the simulated topology, management algorithms can be tested using various vantage points of the NMS. Based on these simulations, an optimum connection point NMS in a real network can be determined, and management algorithms that take into account the vantage point of the NMS can be constructed.

According to one embodiment of the invention, a network diagramming tool is provided which allows a user to diagram a network or import a diagram of a network, into a simulation, and export the simulation to a diagram. The network diagramming tool may be a commercially available tool such as Visio, PowerPoint, Actrix, or any other network diagramming tool, or may be a specially-programmed tool that performs network diagramming functions. The network diagramming tool may provide a graphical depiction of the network, for example with icons depicting network devices and lines depicting connections between the network devices. However, a text-based or command-line network diagramming tool may also be used. Because network administrators typically plan their networks using network diagramming tools, importing such diagrams into a simulation can save time in entering network topology information into a simulation.

Figure 7:
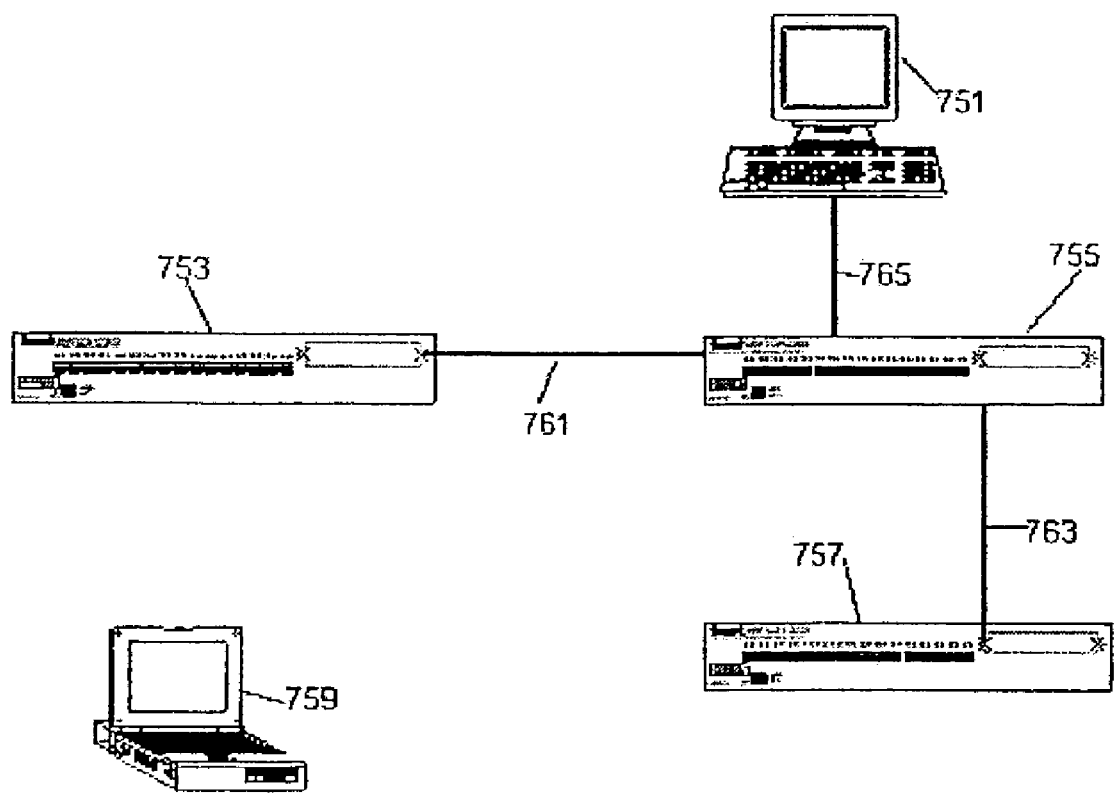
FIG. 7 is an example of a user interface of a conventional network diagramming tool.

An example of a user interface of suitable network diagramming tool is depicted in FIG. 7. A user may select icons representing network devices from a panel. Icons representing network devices may then be placed in the simulation, such as icons 751, 753, 755, 757, and 759. These icons may then be connected with lines (761, 763, 765) to indicate network connections between devices.

Figure 6:
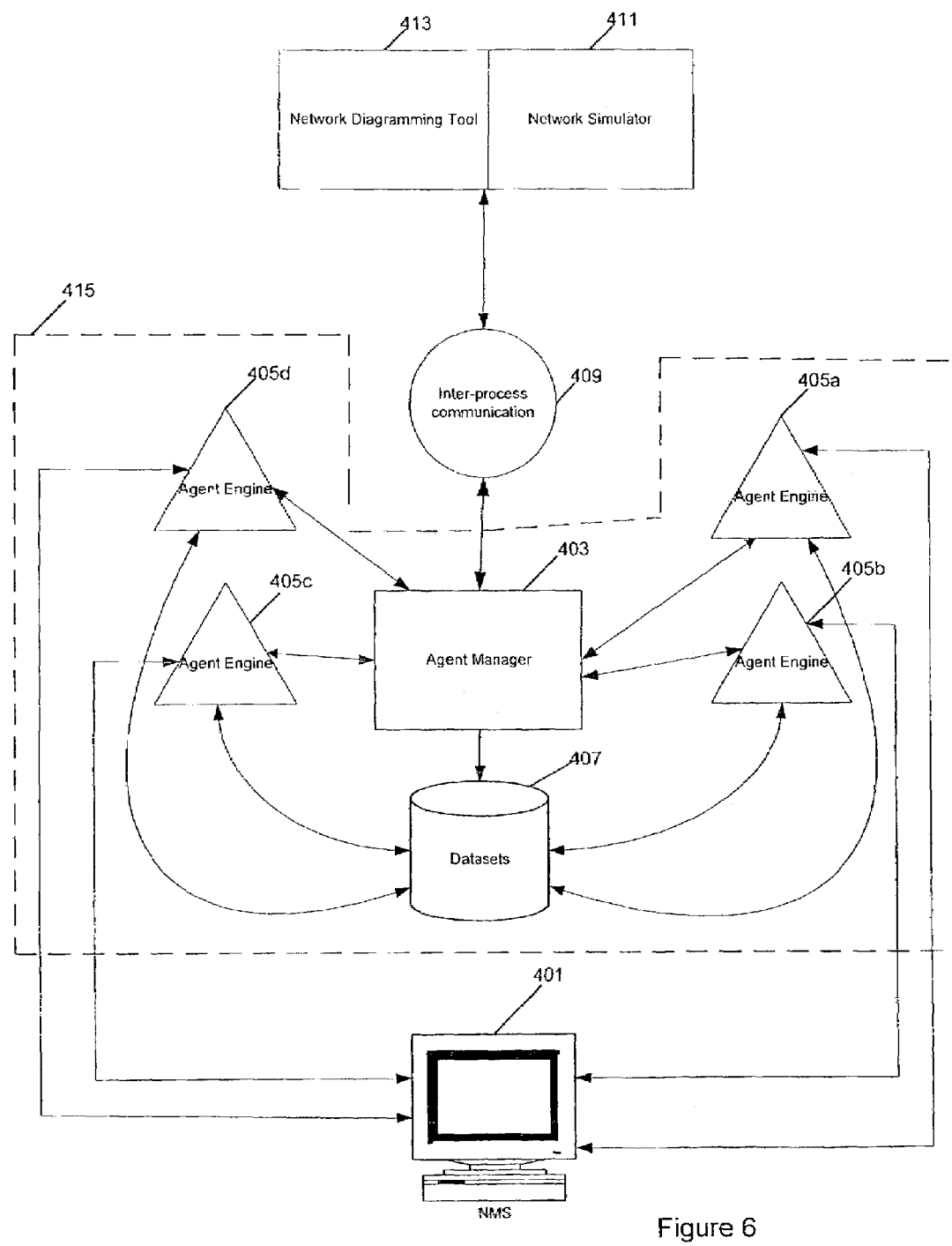
FIG. 6 is a block diagram of a network simulation system according to one embodiment of the present invention.

As shown in FIG. 6, network simulator 411 interfaces with network diagramming tool 413 to control and monitor the status of network devices and network connections depicted in the network diagram. Device simulations 415 includes agent engines 405A-405D, agent manager 403, and data sets 407. Each agent engine 405 simulates the SNMP agent of a real network device. It should be understood that SNMP is provided only as an example of a message protocol. Any network message or management protocol could be used.

When an agent engine receives an SNMP query, it retrieves the appropriate response from dataset 407. Agent manager 403 is used to start, stop, and monitor agent engines. For example, agent manager 403 may spawn or kill the computer processes of agent engines. Agent manager 403 can also be used to assign IP addresses to the agent engines so that they can respond to SNMP queries sent to those IP addresses. Agent manager 403 can also be used to create and modify datasets 407 to control the behavior of agent engines 405. NMS 401 is connected via a network to a computer running the agent engines and agent manager and also the network diagramming tool and network simulator. NMS 401 can send SNMP queries to the IP addresses assigned to agent engines 405. These IP addresses are mapped to the IP address of the machine running the agent manager and agent engines and then mapped to the agent engine for which the request was intended. The agent engine can then reply to this query based on data in its corresponding data set 407.

Because these agent engines operate independently of each other, it is necessary to provide agent manager 403 and agent engines 405 with connection information. In this embodiment, network diagramming tool 413, network simulator 411, and device simulations 415 are running on the same computer, so the connection information can be transferred via interprocess communication 409. However, if these processes are not running on the same computer, connection information may be sent over a network using any suitable network media and protocol.

Generally, communication between processes according to various embodiments of the invention can be any type of communication between processes. For example, interprocess communication could be Microsoft Corporation's Component Object Model (COM), Object Linking and Embedding (OLE), Dynamic Data Exchange (DDE), named pipes, anonymous pipes, semaphores, shared memory, shared files, mail slots, NetBIOS, sockets, Windows Messages, Windows Atoms, the Windows Registration Database, or the Windows Clipboard. The invention is not limited to any particular form of communication, and it should be appreciated that any type of interprocess communication could be used. Running the network device simulator processes and the network simulator processes on the same computer system allows for simplification in configuration in that the computer systems need not be configured and connected through a network. Additionally, if the network device simulator processes and the network simulator processes are executed on the same machine, messages between the two need not be passed through a real network, thus reducing the probability that a real network fault between two communicating computer systems could affect the simulation.

When a user changes the status of a network device in the network diagram, for example by indicating a power down of the device or a disabling of a port of a network device, network simulator 411 can pass this status information to device simulations 415 through interprocess communication 409. Likewise, when a link or a connection is disabled by using the network diagramming tool, network simulator 411 can also pass correction information to device simulations 415 through interprocess communication 409. Additionally, when new network devices or connections are added into the network diagram, or when network devices are deleted from the network diagram, network simulator can notify device simulations 415 via interprocess communication 409. Device simulations 415 can respond by modifying data sets, stopping agent engines, or creating new agent engines. In this manner, agent engines can react to modifications in the network topology. Alternatively, all connection information from network simulator 411 can be sent directly to agent manager 403, which can then control the agent engines and datasets in a similar manner as described above.

As mentioned above, the network diagram of the simulated network may be manually generated by a user. Conversely, the network diagram may be generated automatically be performing autodiscovery on a live network and importing the autodiscovered network topology into the network diagramming tool.

According to one embodiment of the invention, a method for autodiscovering an actual network to be simulated is provided. Because autodiscovery functionality is provided, errors associated with manually configuring a simulated network can be avoided. Also, the amount of time needed to perform the simulation is reduced. A method for automatically populating network simulators is disclosed by Lewis in U.S. Pat. No. 6,014,697, which is hereby incorporated by reference in its entirety. Lewis discloses a method for automatically populating the dataset of the network device by recording data from an actual network device and translating this data into a format required by the simulated device. Thus, the time consuming and error-prone manual method of populating a data set is avoided.

Figure 8:
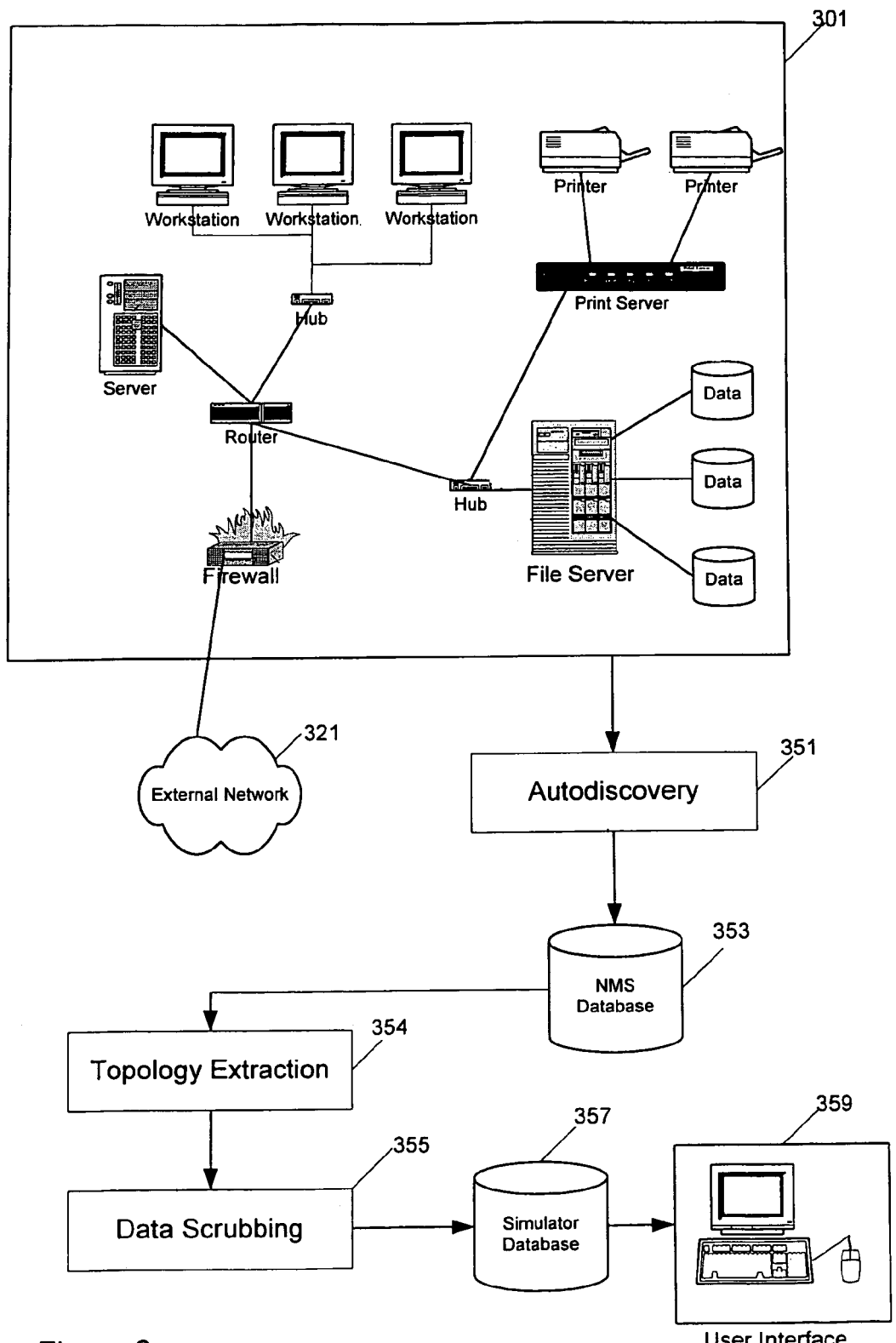
FIG. 8 is diagram of an example method for importing live network data into a network simulation according to one embodiment of the invention.

FIG. 8 illustrates a process of autodiscovering a live network according to one embodiment of the present invention. FIG. 8 depicts a live network 301, and at step 35 1, autodiscovery is performed on live network 301. During the autodiscovery process, port address information is collected from network devices. The topology of the network can be determined by identifying connections based on collected address information. It should be apparent that any topology algorithm may be used to determine connectivity. Additionally, information about each device can be obtained from the management information base (MIB) of the device. A MIB is a logical database made up of the configuration, status, and statistical information stored at a device. MIBs include both standard and vendor specific information related to the connectivity status of the device, and this connectivity information may be collected and stored by the network management system.

Topology information can then be saved in the network management system database, as shown at step 353. Then, at step 354, topology extraction is performed. Topology extraction according to one embodiment of the invention involves the following subfunctions: first data is read from the topology information in the NMS database, then data is translated from the NMS database format to a data format required by the diagramming tool or simulation tool. Next, at step 355, the data is cleaned so that environmental information is removed. For example, a device may have connection information stored regarding neighboring devices to which the device was connected, and this connection information should be removed, particularly if it will have different neighbor devices in the simulation.

Finally, properly formatted data is provided to the diagramming tool or simulator tool (Step 357). For example, network diagram data may be formatted into a VSD file format, so that it may be read by Microsoft Visio. For example, network topology information may be translated into Visio objects, and include information such as the type of the object, and the location of the object in the diagram. Alternatively, the topology information may be converted into a format, such as XML, which can then be read by many diagramming tools including Visio. This allows for greater flexibility, in that a number of different diagramming tools may be used, and an implementation is not tied to one specific file format or diagramming tool. The Visio diagram can then serve as the simulated topology, in the manner discussed above.

An operator may modify and adjust the network simulation using user interface 359. This allows a network administrator automatically import a live network into the network diagramming tool and simulate faults and other injected conditions on his network without requiring any downtime of the live network. Moreover, the network administrator can simulate the effects of adding new hardware to the network or removing new hardware to the network without actually modifying the live network.

Figure 9:
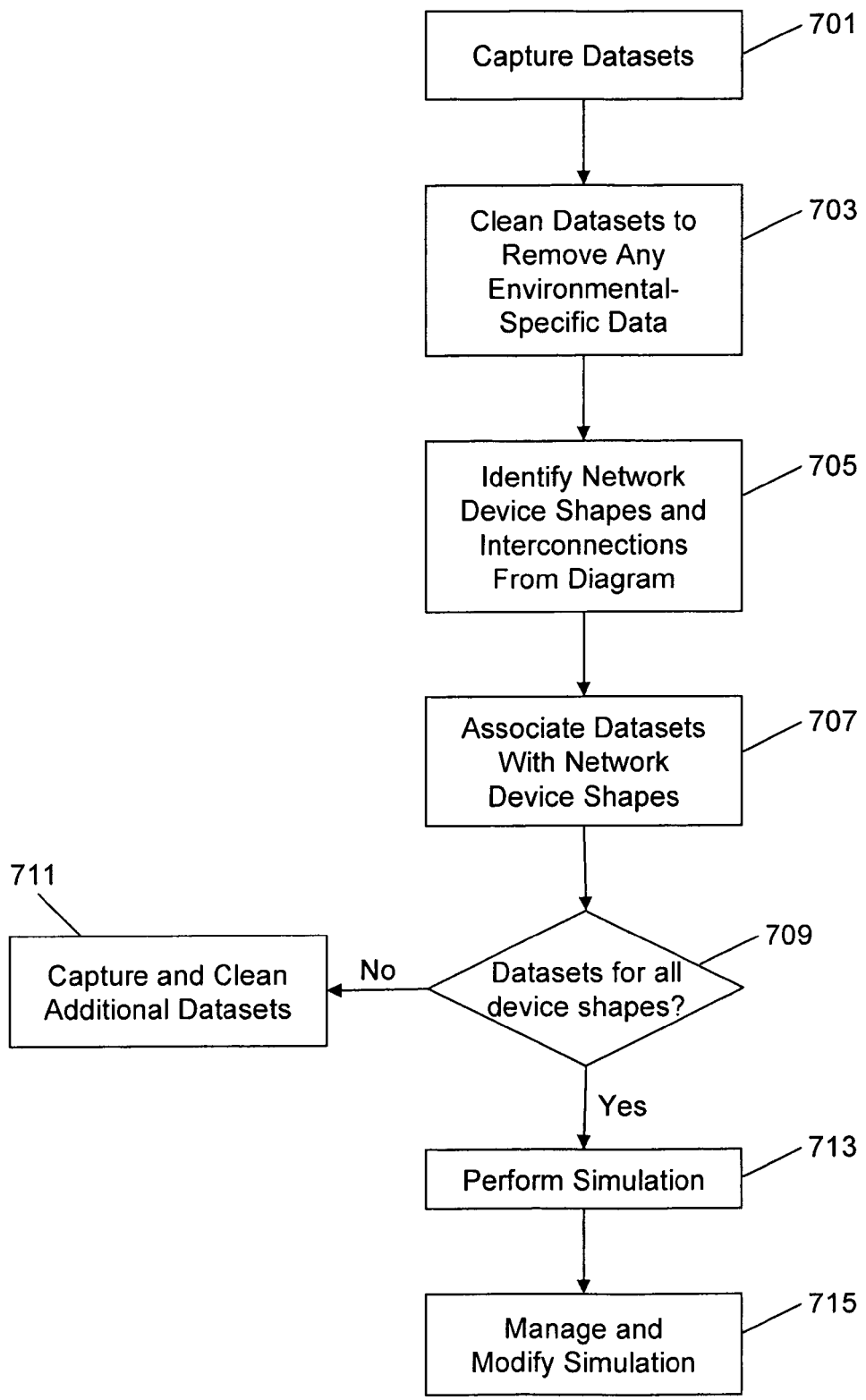
FIG. 9 is a flow chart of an example of a method of operation according to one embodiment of the present invention.

FIG. 9 illustrates generally a process of performing a simulation according to one embodiment of the invention. In step 701, data sets are captured either by recording network messages as described above or by manually creating these data sets. At step 703, these data sets are cleaned to remove any environment specific information. For example, the data sets can contain information about neighboring devices coupled to the real network device which do not apply to the simulated network.

At step 705, the network simulator identifies device shapes and interconnections from the diagram of the network. For example, the network simulator may determine that a particular icon in the network diagram is a Cisco™ 1208 router device. In step 707, the simulator will attempt to associate a captured data set for this network device. If an appropriate data set cannot be found in step 709, then this data set must be captured and cleaned as shown in step 711. For example, if a dataset for a Cisco™ 1200 series router or similar router has not been captured by, for example, cloning the device in the manner described above.

Once data sets for all device shapes in the network diagram are present, the simulation can be performed (step 713). That is, network simulator can start agent engines for each network device in the diagram. Agent engines may then respond to network messages, such as SNMP queries, as if they were real network devices. Once the simulation is running, the simulation can be modified using the network diagram and managed using the network management station (step 715). For example, a user may modify the network diagram to connect additional devices to the simulated network or to disconnect a device from the network. This may, for example, cause several agent engines to start up or shut down. In response, the NMS, which may be programmed with various management algorithms, may, for example, direct other network devices to route network traffic differently or respond to network messages differently.

Having thus described various embodiments of the present invention, additional alterations, modifications, and improvements will readily occur to those skilled in the art. Accordingly, the foregoing description is by way of example only, and not intended to be limiting. The invention is limited only as defined in the following claims and the equivalence thereto.

What is claimed is:

1. A method for simulating a live computer network via a network entity simulator, the network entity simulator operative via a computer and responsive to network messages, the method comprising:

discovering a topology of the live computer network, wherein the discovered topology includes a plurality of network entities and at least one connection between at least two of the plurality of network entities;

simulating the live computer network, the simulated computer network having a topology that includes simulations of the plurality of network entities and a simulation of the at least one connection between the at least two connected network entities, wherein simulating the live computer network includes:

simulating each of the plurality of network entities, simulating the at least one connection between the at least two connected network entities, wherein the simulated connection includes a status, applying a network management algorithm to the simulated computer network, wherein the network management algorithm is configured to analyze one or more faults in the simulated computer network, and injecting one or more simulated conditions into the simulated computer network, wherein the simulated conditions test whether the network management algorithm correctly analyzes one or more faults in the simulated computer network that are caused by the simulated conditions;

automatically updating the topology of the simulated computer network in response to discovering one or more changes to the topology of the live computer network; and testing the network management algorithm applied to the simulated computer network, wherein testing the management algorithm includes:

providing at least one network message to the simulated computer network via the network entity simulator, and receiving a response to the at least one network message from the simulated computer network, wherein the response depends on the status of the simulated connection in the updated topology with the one or more simulated conditions injected into the simulated computer network and with the network management algorithm applied to the simulated computer network.

2. The method of claim 1, wherein the at least one network message is provided to the simulated computer network over a communications network.

3. The method of claim 2, wherein the at least one network message is provided over the communications network by a network management station.

4. The method of claim 1, wherein simulating each of the plurality of network entities further comprises collecting datasets describing behavior over time of the simulated plurality of network entities.

5. The method of claim 4, wherein collecting the datasets further comprises recording data from at least one of the simulated plurality of network entities.

6. The method of claim 4, wherein collecting the datasets further comprises removing environment specific data from the datasets.

7. The method of claim 1, wherein the network entity simulator is responsive to communications received over a communications network according to a network management protocol.

8. The method of claim 7, wherein the network management protocol is Simple Network Management Protocol (SNMP).

9. The method of claim 1, wherein simulating the at least one connection between the at least two connected network entities further comprises indicating the simulated connection between the at least two connected network entities using a network diagramming tool.

10. The method of claim 1, wherein simulating the at least one connection between the at least two connected network entities further comprises providing simulated connection data to the at least two connected network entities.

11. The method of claim 10, further comprising providing the simulated connection data to the at least two connected network entities using interprocess communication.

12. The method of claim 10, further comprising providing the simulated connection data to the at least two connected network entities over a communications network.

13. The method of claim 1, wherein simulating the at least one connection between the at least two connected network entities further comprises associating the at least two connected network entities with respective icons in a network diagram and associating the at least one simulated connection with at least one respective connection between the icons in the network diagram.

14. The method of claim 13, further comprising dynamically modifying the network diagram to include the status of the simulated connection in the updated topology with the one or more simulated conditions injected into the simulated computer network.

15. The method of claim 1, wherein testing the network management algorithm further includes:

using the network management algorithm in the live computer network in response to a user determining that the network management algorithm correctly analyzed the faults caused by the simulated conditions, and enabling the user to modify the network management algorithm in response to the user determining that the network management algorithm incorrectly analyzed the faults caused by the simulated conditions.

16. The method of claim 1, wherein the network management algorithm is further configured to perform one or more of root cause analysis, impact analysis, or event correlation to analyze the one or more faults in the simulated computer network.

17. The method of claim 1, wherein simulating the live computer network further includes simulating a network management station having a connection point in the topology of the simulated computer network, wherein the simulated network management station is configured to apply the network management algorithm to the simulated computer network.

18. The method of claim 17, wherein the response received from the simulated computer network further depends on the connection point of the simulated network management station in the topology of the simulated computer network.

19. The method of claim 18, further comprising determining an optimum connection point for the network management station in the topology of the live computer network based on the response received from the simulated computer network.

20. A method for testing a network management algorithm via a network entity simulator, the network entity simulator operative via a computer and responsive to network messages, comprising:

discovering a topology of a live computer network, wherein the discovered topology includes a plurality of network entities and at least one connection between at least two of the plurality of network entities;

providing a simulated computer network that is responsive to communications received over a communications network, wherein the simulated computer network has a topology that includes simulations of the plurality of simulated network entities and a simulation of the at least one connection between the at least two connected network entities, wherein the simulated connection includes a status;

applying a network management algorithm to the simulated computer network, wherein the network management algorithm is configured to analyze one or more faults in the simulated computer network;

injecting one or more simulated conditions into the simulated computer network, wherein the simulated conditions test whether the network management algorithm correctly analyzes one or more faults in the simulated computer network that are caused by the simulated conditions;

automatically updating the topology of the simulated computer network in response to discovering one or more changes to the topology of the live computer network; and testing the network management algorithm applied to the simulated computer network using a network management station external to the simulated computer network, wherein testing the network management algorithm includes:

providing at least one network message to the simulated computer network via the network entity simulator, and receiving a response to the at least one network message from the simulated computer network, wherein the response depends on the status of the simulated connection in the updated topology with the one or more simulated conditions injected into the simulated computer network and with the network management algorithm applied to the simulated computer network.

21. The method of claim 20, further comprising evaluating the results of testing the network management algorithm applied to the simulated computer network.

22. The method of claim 20, further comprising using the network management station to apply the network management algorithm to the simulated computer network.

23. The method of claim 20, wherein the simulated computer network is simulated by:

simulating each of the plurality of simulated network entities using a network entity simulator that is responsive to network messages received over a communications network, and simulating the at least one simulated connection between the at least two connected network entities, wherein the simulated connection includes the status of the simulated connection.

24. The method of claim 23, wherein simulating the at least one connection between the at least two connected network entities further comprises providing simulated connection data to the at least two connected network entities.

25. The method of claim 24, further comprising providing the simulated connection data to the at least two connected network entities using interprocess communication.

26. The method of claim 24, further comprising providing the simulated connection data to the at least two connected network entities over a communications network.

27. The method of claim 20, wherein the network management station applies the network management algorithm to the simulated computer network over a communication network.

28. The method of claim 20, wherein testing the network management algorithm further includes:

using the network management algorithm in the computer network in response to a user determining that the network management algorithm correctly analyzed the faults caused by the simulated conditions, and enabling the user to modify the network management algorithm in response to the user determining that the network management algorithm incorrectly analyzed the faults caused by the simulated conditions.

29. A method for simulating a computer network via a network entity simulator, the network entity simulator operative via a computer arid responsive to network messages, the method comprising:

providing a network diagram of the computer network using a network diagramming tool, wherein the network diagram provides a topology for the computer network that includes a plurality of network entities and at least one connection between at least two of the plurality of network entities;

simulating the computer network according to the network diagram, wherein the simulated computer network has a topology that includes simulations of the plurality of network entities and a simulation of the at least one connection between the at least two connected network entities, wherein simulating the computer network includes:

simulating each of the plurality of network entities, simulating the at least one connection between the at least two connected network entities, wherein the simulated connection includes a status, applying a network management algorithm to the simulated computer network, wherein the network management algorithm is configured to analyze one or more faults in the simulated computer network, and injecting one or more simulated conditions into the simulated computer network, wherein the simulated conditions test whether the network management algorithm correctly analyzes one or more faults in the simulated computer network that are caused by the simulated conditions;

automatically updating the topology of the simulated computer network in response to discovering one or more changes to the topology of the computer network in the network diagram; and testing the network management algorithm applied to the simulated computer network, wherein testing the management algorithm includes:

providing at least one network message to the simulated computer network via the network entity simulator and receiving a response to the at least one network message from the simulated computer network, wherein the response depends on the status of the simulated connection in the updated topology with the one or more simulated conditions injected into the simulated computer network and with the network management algorithm applied to the simulated computer network.

30. The method of claim 29, further comprising providing a plurality of respective agent engines for simulating each of the plurality of network entities in the network diagram.

31. The method of claim 29, further comprising providing access to the simulated computer network over a communications network.

32. The method of claim 31, further comprising using a network management station to manage simulating the computer network.

33. The method of claim 32, wherein the network management. station manages simulating the computer network over the communications network.

34. The method of claim 29, further comprising dynamically modifying the network diagram to include the status of the simulated connection with the one or more simulated conditions injected into the simulated computer network.

35. The method of claim 29, wherein testing the network management algorithm further includes:

using the network management algorithm in the computer network in response to a user determining that the network management algorithm correctly analyzed the faults caused by the simulated conditions, and enabling the user to modify the network management algorithm in response to the user determining that the network management algorithm did not incorrectly analyzed the faults caused by the simulated conditions.

36. A system for simulating a computer network having a topology that includes a plurality of network entities and at least one connection between at least two of the plurality of network entities, the system comprising:

a network entity simulator that simulates the plurality of network entities, the network entity simulator responsive to network messages;

a network simulator that simulates the computer network, the simulated computer network having a topology that includes the simulated plurality of network entities and a simulation of the at least one connection between the at least two connected network entities, wherein the simulated connection includes a status and wherein the network simulator is configured to:

apply a network management algorithm to the simulated computer network, wherein the network management algorithm is configured to analyze one or more faults in the simulated computer network;

inject one or more simulated conditions into the simulated computer network, wherein the simulated conditions test whether the network management algorithm correctly analyzes one or more faults in the simulated computer network that are caused by the simulated conditions;

automatically update the topology of the simulated computer network in response to discovering one or more changes to the topology of the computer network;

provide at least one network message to the simulated computer network via the network entity simulator; and receive a response to the at least one network message from the simulated computer network, wherein the response depends on the status of the simulated connection in the updated topology with the one or more simulated conditions injected into the simulated computer network and with the network management algorithm applied to the simulated computer network.

37. The system of claim 36, wherein the network entity simulator includes a plurality of respective agent engines for simulating each of the plurality of network entities, the system further comprising an agent manager that controls operation of the plurality of agent engines.

38. The system of claim 36, wherein the network simulator includes a network diagramming tool for providing a network diagram of the simulated network, the network diagramming tool having a user interface that allows a user to modify the topology of the computer network and the simulated computer network.

39. The system of claim 38, wherein the network diagram includes a plurality of respective icons associated with the plurality of simulated network entities.

40. The system of claim 36, further comprising an inter-process communication mechanism that transfers data between the network simulator and the network entity simulator.

41. The system of claim 36, wherein the network simulator provides simulated connection data to the network entity simulator through interprocess communication.

42. The system of claim 36, wherein the network management station provides the network messages to the network entity simulator over a communications network.

43. A computer program product for simulating a computer network via a network entity simulator, the network entity simulator operative via a computer and responsive to network messages, the computer program product comprising a computer-readable medium having encoded therein instructions which when executed by a computer system cause the computer system to:

discover a topology of the computer network, wherein the discovered topology includes a plurality of network entities and at least one connection between at least two of the plurality of network entities;

simulate the computer network, the simulated computer network having a topology that includes simulations of the plurality of network entities and a simulation of the at least one connection between the at least two connected network entities, wherein simulating the computer network includes:

simulating each of the plurality of network entities, simulating the at least one connection between the at least two connected network entities, wherein the simulated connection includes a status, applying a network management algorithm to the simulated computer network, wherein the network management algorithm is configured to analyze one or more faults in the simulated computer network, and injecting one or more simulated conditions into the simulated computer network, wherein the simulated conditions test whether the network management algorithm correctly analyzes one or more faults in the simulated computer network that are caused by the simulated conditions;

automatically update the topology of the simulated computer network in response to discovering one or more changes to the topology of the computer network; and test the network management algorithm applied to the simulated computer network, wherein testing the management algorithm includes:

providing at least one network message to the simulated computer network via the network entity simulator, and receiving a response to the at least one network message from the simulated computer network, wherein the response depends on the status of the simulated connection in the updated topology with the one or more simulated conditions injected into the simulated computer network and with the network management algorithm applied to the simulated computer network.

44. The computer program product of claim 43, wherein the instructions further cause the computer system to collect datasets describing behavior over time of the simulated plurality of network entities.

45. The computer program product of claim 44, wherein the instructions causing the computer system to collect the datasets further cause the computer system to record data from at least one of the simulated plurality of network entities.

46. The computer program product of claim 44, wherein the instructions causing the computer system to collect the datasets further cause the computer system to remove environment specific data from the datasets.

47. A computer program product for testing a network management algorithm via a network entity simulator, the network entity simulator operative via a computer and responsive to network messages, the computer program product comprising a computer-readable medium having encoded therein instructions which when executed by a computer system cause the computer system to:

discover a topology of a live computer network, wherein the discovered topology includes a plurality of network entities and at least one connection between at least two of the plurality of network entities;

provide a simulated computer network that is responsive to communications received over a communications network, wherein the simulated computer network has a topology that includes simulations of the plurality of simulated network entities and a simulation of the at least one connection between the at least two connected network entities, wherein the simulated connection includes a status;

apply a network management algorithm to the simulated computer network, wherein the network management algorithm is configured to analyze one or more faults in the simulated computer network;

inject one or more simulated conditions into the simulated computer network, wherein the simulated conditions test whether the network management algorithm correctly analyzes one or more faults in the simulated computer network that are caused by the simulated conditions;

automatically update the topology of the simulated computer network in response to discovering one or more changes to the topology of the live computer network; and test the network management algorithm applied to the simulated computer network using a network management station external to the simulated computer network, wherein testing the network management algorithm includes:

providing at least one network message to the simulated computer network via the network entity simulator, and receiving a response to the at least one network message from the simulated computer network, wherein the response depends on the status of the simulated connection in the updated topology with the one or more simulated conditions injected into the simulated computer network and with the network management algorithm applied to the simulated computer network.

48. The computer program product of claim 47, wherein the instructions further cause the computer system to evaluate the results of testing the network. management algorithm applied to the simulated computer network.

49. The computer program product of claim 47, wherein the instructions causing the computer system to provide the simulated computer network further cause the computer system to:

simulate each of the plurality of simulated network entities using a network entity simulator that is responsive to network messages received over a communications network, and simulate the at least one simulated connection between the at least two connected network entities, wherein the simulated connection includes the status of the simulated connection.

50. The computer program product of claim 49, wherein the instructions causing the computer system to simulate the at least one connection further cause the computer system to provide simulated connection data to the at least two connected network entities.

51. The computer program product of claim 50, wherein the instructions cause the computer system to provide the simulated connection data to the at least two connected network entities using interprocess communication.

52. The computer program product of claim 50, wherein the instructions cause the computer system to provide the simulated connection data to the at least two connected network entities over a communications network.

53. A computer program product for simulating a computer network via a network entity simulator, the network entity simulator operative via a computer and responsive to network messages, the computer program product comprising a computer-readable medium having encoded therein instructions which when executed by a computer system cause the computer system to:

provide a network diagram of the computer network using a network diagramming tool, wherein the network diagram provides a topology for the computer network that includes a plurality of network entities and at least one connection between at least two of the plurality of network entities;

simulate the computer network according to the network diagram, wherein the simulated computer network has a topology that includes simulations of the plurality of network entities and a simulation of the at least one connection between the at least two connected network entities, wherein simulating the computer network includes:

simulating each of the plurality of network entities, simulating the at least one connection between the at least two connected network entities, wherein the simulated connection includes a status, applying a network management algorithm to the simulated computer network, wherein the network management algorithm is configured to analyze on or more faults in the simulated computer network, and injecting one or more simulated conditions into the simulated computer network, wherein the simulated conditions test whether the network management algorithm correctly analyzes one or more faults in the simulated computer network that are caused by the simulated conditions;

automatically update the topology of the simulated computer network in response to discovering one or more changes to the topology of the computer network in the network diagram; and test the network management algorithm applied to the simulated computer network, wherein testing the management algorithm includes:

providing at least one network message to the simulated computer network via the network entity simulator, and receiving a response to the at least one network message from the, simulated computer network, wherein the response depends on the status of the simulated connection in the updated topology with the one or more simulated conditions injected into the simulated computer network and with the network management algorithm applied to the simulated computer network.

54. The computer program product of claim 53, further comprising instructions which cause the computer system to provide a plurality of respective agent engines for simulating each of the plurality of network entities identified in the network diagram.

55. The computer program product of claim 54, wherein the instructions further cause the computer system to provide access to the simulated computer network over a communications network.

* * * * *